United States Patent
Viering et al.

(10) Patent No.: US 8,594,660 B2
(45) Date of Patent: Nov. 26, 2013

(54) SELF-OPTIMIZATION OF CELL OVERLAP

(75) Inventors: Ingo Viering, Munich (DE); Martin Doettling, Neubiberg (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/266,977

(22) PCT Filed: Apr. 28, 2009

(86) PCT No.: PCT/EP2009/055152
§ 371 (c)(1),
(2), (4) Date: Jan. 13, 2012

(87) PCT Pub. No.: WO2010/124724
PCT Pub. Date: Nov. 4, 2010

(65) Prior Publication Data
US 2012/0108232 A1     May 3, 2012

(51) Int. Cl.
*H04W 24/00* (2009.01)
(52) U.S. Cl.
USPC ........ 455/424; 455/500; 455/501; 455/414.2; 455/13.4; 455/63.1; 455/25; 455/67.13; 455/114.2; 455/115.1; 455/125
(58) Field of Classification Search
USPC .............. 455/500, 501, 414.2, 13.4, 63.1, 25, 455/67.13, 114.2, 115.1, 125
See application file for complete search history.

(56) References Cited

U.S. PATENT DOCUMENTS

| | | | |
|---|---|---|---|
| 5,095,500 A | 3/1992 | Tayloe et al. | 379/32 |
| 6,445,917 B1* | 9/2002 | Bark et al. | 455/423 |
| 2004/0266352 A1* | 12/2004 | Kuurne et al. | 455/63.1 |
| 2006/0128371 A1* | 6/2006 | Dillon et al. | 455/423 |

FOREIGN PATENT DOCUMENTS

| | | | |
|---|---|---|---|
| GB | 2 271 486 A | 4/1994 | |
| WO | WO 2008/151674 A1 | 12/2008 | |

OTHER PUBLICATIONS

Feng, S., et al., "Self-Organizing Networks (SON) in 3GPP Long Term Evolution", May 20, 2008, Nomor Research GmbH, Munich, Germany, 15 pgs.
NEC Corporation, "Self Organizing Network," NEC's proposals for next-generation radio network management, Feb. 2009, 5 pgs.
3GPP TS 32.500 V8.0.0 (Dec. 2008), "$3^{rd}$ Generation Partnership Project; Technical Specification Group Services and System Aspects; Telecommunication Management; Self-Organizing Networks (SON); Concepts and requirements (Release 8)", 13 pgs.

* cited by examiner

*Primary Examiner* — Kwasi Karikari
(74) *Attorney, Agent, or Firm* — Harrington & Smith (57) ABSTRACT

An apparatus includes a report configuration controller configured to command reporting an event defined by receipt of a plurality of signals of different senders, wherein the signals are received at a same location, the signals are received with a strength above an absolute threshold, and a difference of the strengths is within a relative threshold. Another apparatus includes an aggregator configured to aggregate information reflecting an event defined by receipt of a plurality of signals of different senders, wherein the signals are received at a same location, the signals are received with a strength above an absolute threshold, and a difference of the strengths is within a relative threshold; and an aggregated information provider configured to provide the aggregated information.

30 Claims, 4 Drawing Sheets

SELF-OPTIMIZATION OF CELL OVERLAP

FIELD OF THE INVENTION

The present invention relates to an apparatus, method, system and computer program product for the self optimization of cell overlap.

RELATED BACKGROUND ART

Prior art which is related to this technical field can e.g. be found by the technical specification TS 32.500 current version: 8.0.0) of the 3GPP.

Figure 1:
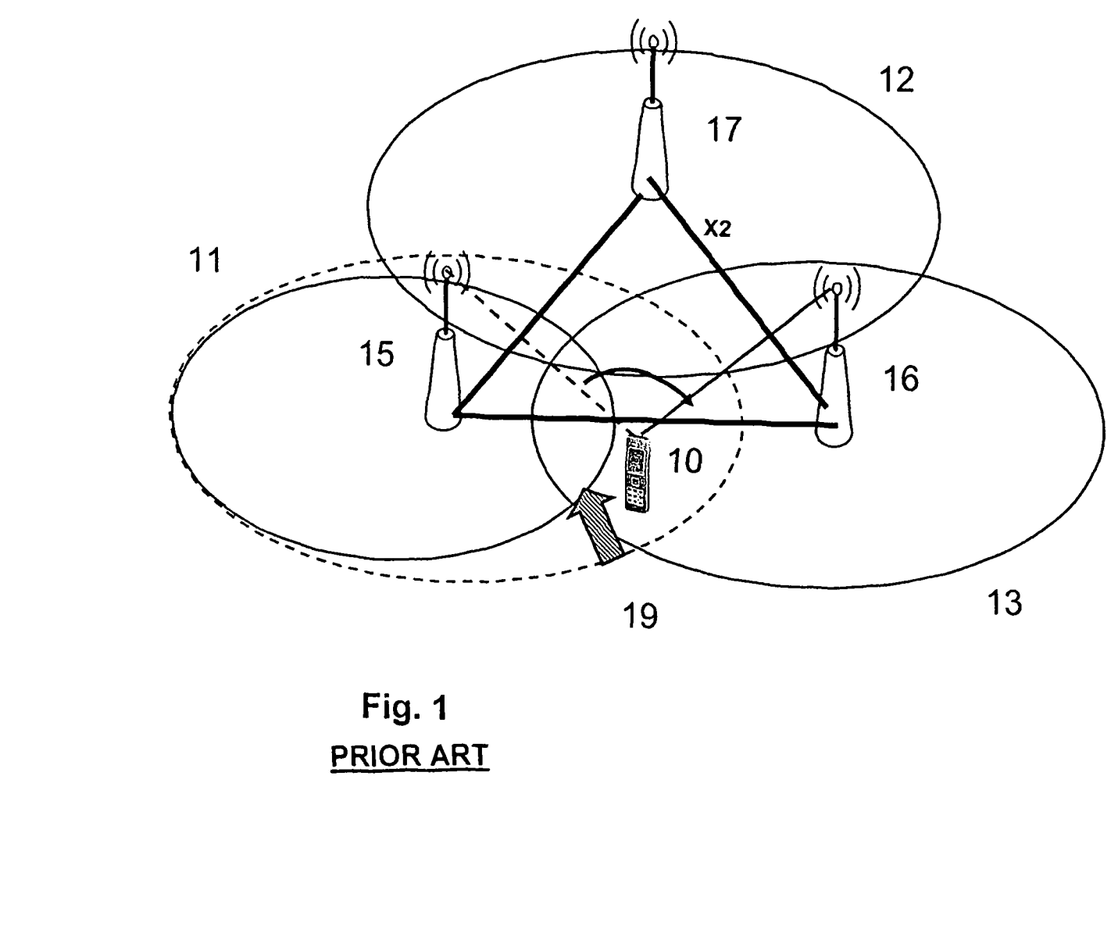
FIG. 1 shows a basic situation of cell coverage and cell overlap areas in a cellular communication network.

The following meanings for the abbreviations used in this specification apply:
3GPP: 3$^{rd}$ Generation Partnership Project
BS: Base Station
CDF: Cumulative Distribution Function
DM: Domain Manager
EM: Element Manager
eNB: evolved Node B (eNodeB)
FDD: Frequency Division Duplex
GPS: Global Positioning System
HO: Handover
ID: Identity
ISD: Inter Site Distance
Itf-N: Standardized interface between NM and EM or sometimes NM and NE
Itf-?: Interface between EM and NE; "?" is a placeholder, e.g. Itf-R, if NE is a RNC; or Itf-B, if NE is a NodeB
LB: Load Balancing
LTE: Long Term Evolution
NE: Network Element (e.g. a RNC, NodeB or eNodeB)
NM: Network Manager
OAM: Operation and Maintenance
RLF: Radio Link Failure
RNC: Radio Network Controller
RSRP: Received Signal Reference Power
SON: Self Organizing Networks
TA: Timing Advance
TDD: Time Division Duplex
UE: User Equipment FIG. 1 shows a typical scenario in a cellular communication network. There are base stations 15, 16 and 17 with coverage areas 11, 12 and 13, respectively, i.e. the cells.

For example, in a LTE-based network, a base station is implemented as eNB.

A UE 10 which is in connectivity status (indicated by a broken line) with a particular base station 15 may move into an area covered by another base station 16. Since the UE 10 executes neighbor measurements (i.e. measures the signal strength of the base station 15 to which it is currently connected vs. the signal strength of neighboring base stations 16 and 17) based on a pre-defined procedure, e.g. periodically, it will detect if the signal strength of base station 16 is stronger than the signal strength of base station 15 and consequently will initiate a handover procedure in order to get into connectivity status (indicated by a solid line) with base station 16 instead of base station 15.

Apparently, the detection of signals from different base stations is only possible in areas covered by more than one base station. This is called e.g. a cell overlap area (indicated in FIG. 1 by a hatched arrow 19).

Accordingly, e.g. the transmission and/or antenna tilt of the senders of the base stations 15, 16 and 17, respectively have to be set so as to enable this.

However, inappropriate settings of the transmission power and antenna tilt can lead to large areas of cell overlap. In these areas many cells are received with similar signal strength so that UEs will suffer from high interference. Therefore, this phenomenon is also referred to as reference signal pollution.

If the cell overlap areas are too large (in FIG. 1, for coverage area/cell 11 indicated by an ellipse in broken line vs. an ellipse in solid line), excessive interference will negatively impact the system capacity and the risk of unnecessary handover between the cells with similar signal strength increases, thus yielding potential impairment on link quality, HO failures, and unnecessary signaling load.

Currently, cell overlap is entirely but exclusively considered during the network planning phase. The calculations to plan a cell coverage area and respective overlaps are based on models of the environment and the radio propagation. Though, these models have limited accuracy and require high effort.

SUMMARY OF THE INVENTION

It is an object of the present invention to provide a self optimization of cell overlap.

According to a first aspect of the present invention, this is accomplished by an apparatus, comprising a report configuration controller configured to command reporting an event defined by receipt of a plurality of signals of different senders, wherein the signals are received at a same location, the signals are received with a strength above an absolute threshold, and a difference of the strengths is within a relative threshold.

Modifications of the first aspect may be as follows.

The apparatus according to the first aspect may be configured to be suitable for self optimizing cell overlap.

The report configuration controller may be further configured to command reporting information on the location of receipt of the signals; and the apparatus may further comprise a location determination processor configured to determine a radial distance of receipt of a signal from a sender of the signal based on information on the location of receipt of the signal.

The information on the location of receipt of a signal may be one of information from a global positioning system and information on a signal propagation time from the location of receipt of the signal to the sender.

The report configuration controller may be further configured to command the reporting to take place when a condition selected from the following group is fulfilled: a time period has expired; there is a new event; among a plurality of events, a particular sender is concerned at a number of times above a sender number threshold; and a number of events per time period exceeds an event number threshold.

The report configuration controller may be further configured to adjust the relative threshold based on information on a handover reporting procedure involving a sender connectivity change based on a handover criterion reflecting a difference in signal strength received from different sender.

The report configuration controller may be further configured to command reporting an identity of each sender sending a signal involved in the event.

The apparatus may further comprise a sender overlap evaluation processor configured to evaluate how many events occur per location area and/or time, and to command one of adjustment of transmission power of a sender and adjustment of antenna tilt of a sender.

According to a second aspect of the present invention, the object is accomplished by an apparatus, comprising: means for commanding reporting an event defined by receipt of a plurality of signals of different senders, wherein the signals are received at a same location, the signals are received with a strength above an absolute threshold, and a difference of the strengths is within a relative threshold.

Modifications of the second aspect may correspond to the modifications of the first aspect and may particularly include means for determining a radial distance of receipt of a signal from a sender of the signal based on information on the location of receipt of the signal, and/or means for evaluating how many events occur per location area and/or time, and means for commanding one of adjustment of transmission power of a sender and adjustment of antenna tilt of a sender.

According to a third aspect of the present invention, the object is accomplished by an apparatus, comprising an aggregator configured to aggregate information reflecting an event defined by receipt of a plurality of signals of different senders, wherein the signals are received at a same location, the signals are received with a strength above an absolute threshold, and a difference of the strengths is within a relative threshold; and an aggregated information provider configured to provide the aggregated information.

Modifications of the third aspect may be as follows.

The apparatus according to the third aspect may be configured to be suitable for self optimizing cell overlap.

The aggregator may be further configured to command reporting information on the location of receipt of the signals.

The information on the location of receipt of a signal may be one of information from a global positioning system and information on a signal propagation time from the location of receipt of the signal to the sender.

The aggregated information provider may be further configured to provide the aggregated information when a condition selected from the following group is fulfilled: a time period has expired; there is a new event; among a plurality of events, a particular sender is concerned at a number of times above a sender number threshold; and a number of events per time period exceeds an event number threshold.

The aggregator may be further configured to generate information on a handover reporting procedure involving a sender connectivity change based on a handover criterion reflecting a difference in signal strength received from different sender by being configured to compare the relative threshold with the handover criterion; and the aggregated information provider may be further configured to provide the handover criterion as an excluded upper limit for the relative threshold.

The aggregated information provider may be further configured to provide an identity of each sender sending a signal involved in the event.

The apparatus may further comprise an overlap adjustment processor configured to command one of adjustment of sender transmission power and adjustment of sender antenna tilt.

According to a fourth aspect of the present invention, the object is accomplished by an apparatus, comprising means for aggregating information reflecting an event defined by receipt of a plurality of signals of different senders, wherein the signals are received at a same location, the signals are received with a strength above an absolute threshold, and a difference of the strengths is within a relative threshold; and means for providing the aggregated information.

Modifications of the second aspect may correspond to the modifications of the first aspect and may particularly include means for commanding one of adjustment of sender transmission power and adjustment of sender antenna tilt.

According to a fifth aspect of the present invention, the object is accomplished by an evolved Node B, comprising an apparatus according to the third aspect or any of its modifications.

According to a sixth aspect of the present invention, the object is accomplished by an evolved Node B, comprising an apparatus according to the fourth aspect or any of its modifications.

According to a seventh aspect of the present invention, the object is accomplished by a system, comprising an apparatus according to the first aspect or any of its modifications; and an apparatus according to the third aspect or any of its modifications.

According to an eighth aspect of the present invention, the object is accomplished by a system, comprising an apparatus according to the second aspect or any of its modifications; and an apparatus according to the fourth aspect or any of its modifications.

According to a ninth aspect of the present invention, the object is accomplished by a method, comprising commanding reporting an event defined by receipt of a plurality of signals of different senders, wherein the signals are received at a same location, the signals are received with a strength above an absolute threshold, and a difference of the strengths is within a relative threshold.

Modifications of the ninth aspect may be as follows.

The method according to the ninth aspect may be suitable for self optimizing cell overlap.

The commanding reporting may further include commanding reporting information on the location of receipt of the signals; and the method may further comprise determining a radial distance of receipt of a signal from a sender of the signal based on information on the location of receipt of the signal.

The information on the location of receipt of a signal may be one of information from a global positioning system and information on a signal propagation time from the location of receipt of the signal to the sender.

The commanding reporting may further include commanding that the reporting is to take place when a condition selected from the following group is fulfilled: a time period has expired; there is a new event; among a plurality of events, a particular sender is concerned at a number of times above a sender number threshold; and a number of events per time period exceeds an event number threshold.

The method may further comprise adjusting the relative threshold based on information on a handover reporting procedure involving a sender connectivity change based on a handover criterion reflecting a difference in signal strength received from different sender.

The method may further comprise commanding reporting an identity of each sender sending a signal involved in the event.

The method may further comprise evaluating how many events occur per location area and/or time, and commanding one of adjustment of transmission power of a sender and adjustment of antenna tilt of a sender.

According to a tenth aspect of the present invention, the object is accomplished by a method, comprising aggregating information reflecting an event defined by receipt of a plurality of signals of different senders, wherein the signals are received at a same location, the signals are received with a strength above an absolute threshold, and a difference of the strengths is within a relative threshold; and providing the aggregated information.

Modifications of the tenth aspect may be as follows.

The method according to the tenth aspect may be suitable for self optimizing cell overlap.

The aggregating information may further include aggregating information on the location of receipt of the signals.

The information on the location of receipt of a signal may be one of information from a global positioning system and information on a signal propagation time from the location of receipt of the signal to the sender.

The providing further may include providing the aggregated information when a condition selected from the following group is fulfilled: a time period has expired; there is a new event; among a plurality of events, a particular sender is concerned at a number of times above a sender number threshold; and a number of events per time period exceeds an event number threshold.

The method may further comprise generating information on a handover reporting procedure involving a sender connectivity change based on a handover criterion reflecting a difference in signal strength received from different sender by comparing the relative threshold with the handover criterion; and providing the handover criterion as an excluded upper limit for the relative threshold.

The method may further comprise providing an identity of each sender sending a signal involved in the event.

The method may further comprise commanding one of adjustment of sender transmission power and adjustment of sender antenna tilt.

According to an eleventh aspect of the present invention, the object is accomplished by a computer program product comprising computer-executable components which perform, when the program is run on a computer commanding reporting an event defined by receipt of a plurality of signals of different senders, wherein the signals are received at a same location, the signals are received with a strength above an absolute threshold, and a difference of the strengths is within a relative threshold.

Modifications of the eleventh aspect may be as follows.

The computer program product according to the eleventh aspect may be configured to be suitable for self optimizing cell overlap.

The computer program product according to the eleventh aspect may be embodied as a computer-readable storage medium.

Otherwise, modifications of the eleventh aspect may correspond to the modifications of the ninth aspect.

According to a twelfth aspect of the present invention, the object is accomplished by a computer program product comprising computer-executable components which perform, when the program is run on a computer aggregating information reflecting an event defined by receipt of a plurality of signals of different senders, wherein the signals are received at a same location, the signals are received with a strength above an absolute threshold, and a difference of the strengths is within a relative threshold.

Modifications of the twelfth aspect may be as follows.

The computer program product according to the twelfth aspect may be configured to be suitable for self optimizing cell overlap.

The computer program product according to the twelfth aspect may be embodied as a computer-readable storage medium.

Otherwise, modifications of the twelfth aspect may correspond to the modifications of the tenth aspect.

It is to be understood that any of the above modifications can be applied singly or in combination to the respective aspects to which they refer, unless they are explicitly stated as excluding alternatives.

BRIEF DESCRIPTION OF THE DRAWINGS

These and other objects, features, details and advantages will become more fully apparent from the following detailed description of the preferred embodiments which is to be taken in conjunction with the appended drawings, in which.

DETAILED DESCRIPTION OF PREFERRED EMBODIMENTS

In the following, description is made to what are presently considered to be preferred embodiments of the present invention. It is to be understood, however, that the description is given by way of example only, and that the described embodiments are by no means to be understood as limiting the present invention thereto.

For example, for illustration purposes, in the following exemplary embodiments, a self optimization of cell overlap in a 3GPP LTE communication network (such as LTE and LTE advanced) is described. However, it should be appreciated that these exemplary embodiments are not limited for use among these particular types of wireless communication systems, and according to further exemplary embodiments, the present invention may be applied also to other types of cellular communication systems and access networks such as e.g. to WLAN (wireless local area network) and WIMAX (worldwide interoperability for microwave access) techniques and standards.

Thus, certain embodiments of the present invention relate to mobile wireless communication systems, such as 3GPP LTE. Furthermore, certain embodiments of the present invention can be applied to both FDD and TDD technologies.

In more detail, certain embodiments of the present invention are related to an apparatus such as SON equipment and eNB equipment, a system involving either one or both of them, a method, and a computer program product, respectively achieving self optimization of cell overlap.

However, as indicated above, the present invention is not limited to LTE related implementations, but other embodiments of the present invention are related to general implementations providing self optimization of cell overlap.

Figure 2A:
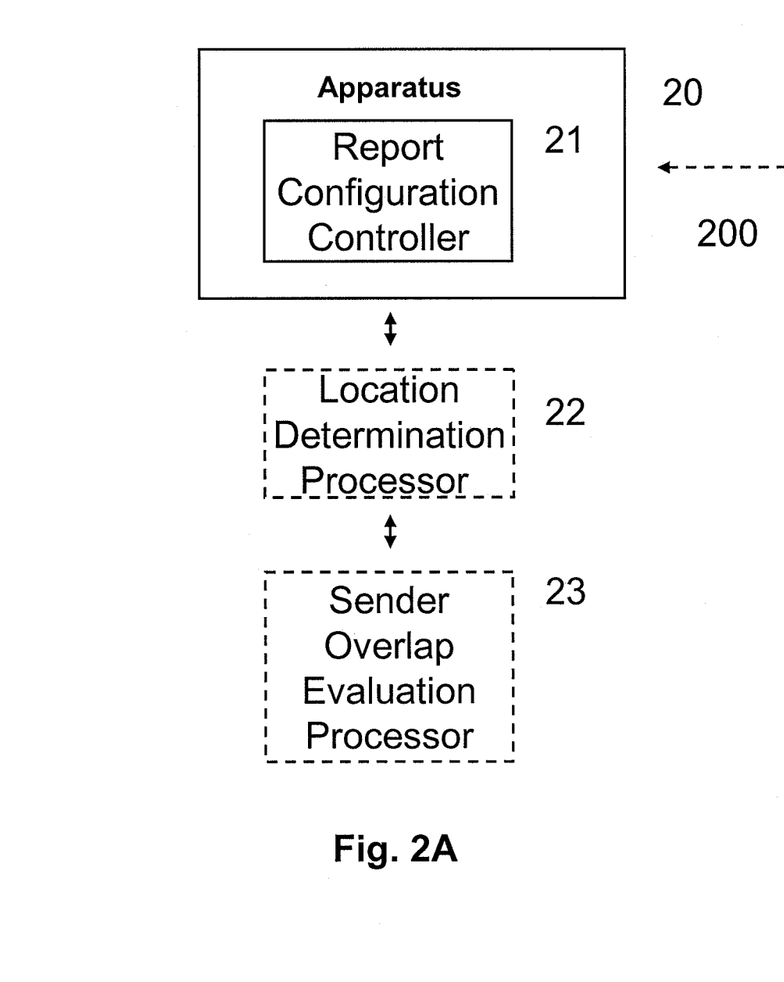
FIG. 2A shows an apparatus according to certain embodiments of the present invention as well as a modification of this apparatus according to other certain embodiments of the present invention.

FIG. 2A shows a principle configuration of an apparatus according to certain embodiments of the present invention. That is, as shown in FIG. 2A, an apparatus 20 comprises a report configuration controller 21 configured to command reporting an event defined by receipt of a plurality of signals of different senders, wherein the signals are received at a same location, the signals are received with a strength above an absolute threshold, and a difference of the strengths is within a relative threshold.

As optional modifications according to further embodiments of the present invention, the apparatus 20 may further comprise a location determination processor 22 configured to determine a radial distance of receipt of a signal from a sender of the signal based on information on the location of receipt of the signal. In this case, the report configuration controller 21 can be further configured to command reporting and information on the location of receipt of the signals.

As a still further optional modification according to other further embodiments of the present invention, the apparatus 20 may additionally or alternatively comprise a sender overlap evaluation processor 23 configured to evaluate how many events occur per location area and/or time, and to command one of adjustment of transmission power of a sender and adjustment of antenna tilt of a sender.

Figure 2B:
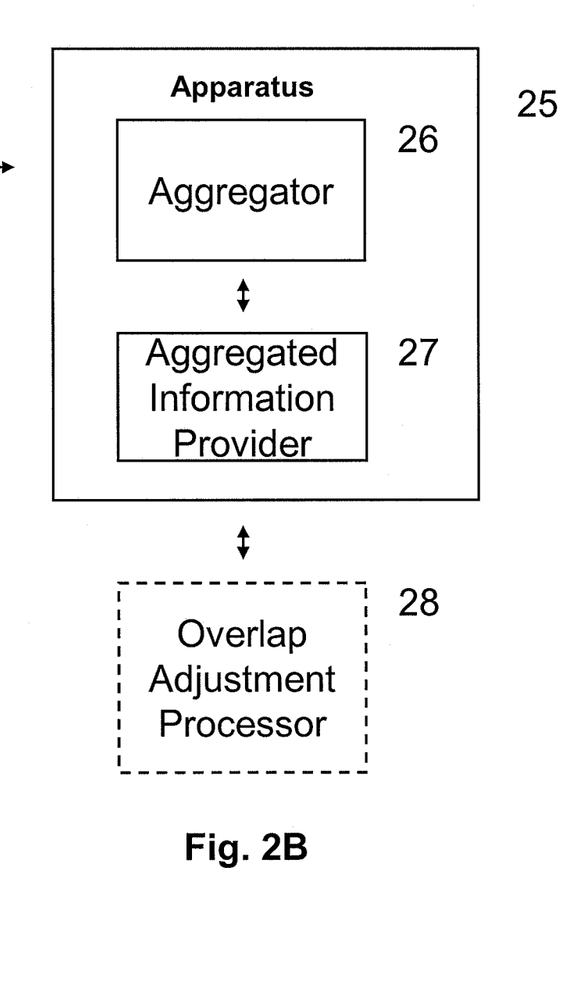
FIG. 2B shows another apparatus according to certain embodiments of the present invention as well as a modification of this another apparatus according to still other certain embodiments of the present invention.

FIG. 2B shows a principle configuration of another apparatus according to certain embodiments of the present invention. That is, as shown in FIG. 2B, an apparatus 25 comprises an aggregator 26 configured to aggregate information reflecting an event defined by receipt of a plurality of signals of different senders, wherein the signals are received at a same location, the signals are received with a strength above an absolute threshold, and a difference of the strengths is within a relative threshold; and an aggregated information provider 27 configured to provide the aggregated information.

As optional modifications according to further embodiments of the present invention, the apparatus 25 may further comprise an overlap adjustment processor 28 configured to command one of adjustment of sender transmission power and adjustment of sender antenna tilt.

Furthermore, according to certain embodiments of the present invention, the apparatus 20 and the apparatus 25 may also form a system 200, as illustrated by viewing FIGS. 2A and 2B together.

Modifications of the system 200 may be represented by modifying either one or both apparatus 20 and apparatus 25 by adding one or more of the processors 22, 23 and 28.

Figure 3A:
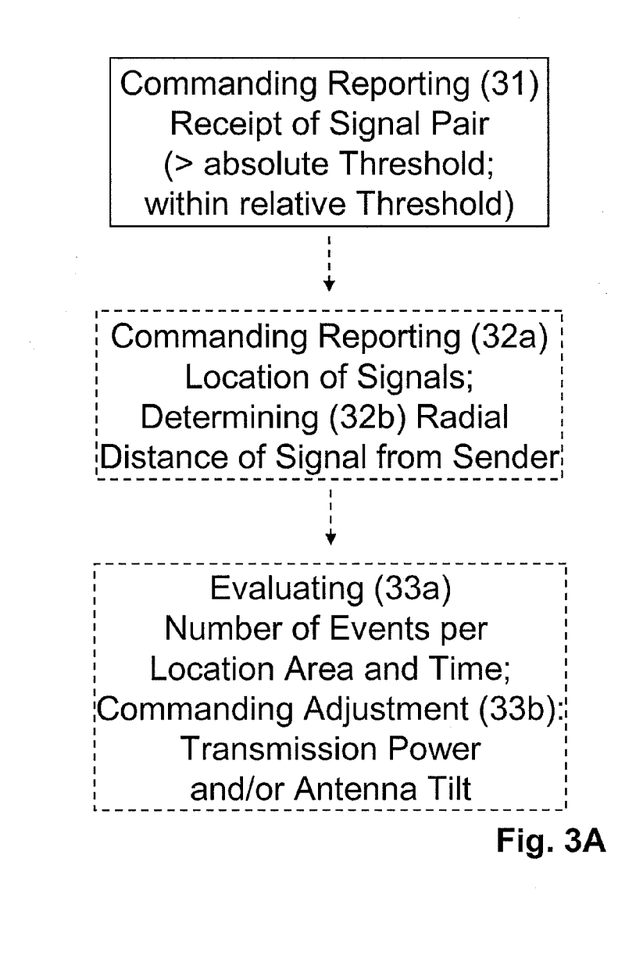
FIG. 3A shows a method according to certain embodiments of the present invention as well as a modification of this method according to other certain embodiments of the present invention.

FIG. 3A shows a principle flowchart of a method according to certain embodiments of the present invention. That is, as shown in FIG. 3A, a method comprises commanding reporting 31 an event defined by receipt of a plurality of signals of different senders, wherein the signals are received at a same location, the signals are received with a strength above an absolute threshold, and a difference of the strengths is within a relative threshold.

As optional modifications according to further embodiments of the present invention, in the method the commanding reporting may further include commanding reporting 32a information on the location of receipt of the signals; and the method may further comprise determining 32b a radial distance of receipt of a signal from a sender of the signal based on information on the location of receipt of the signal.

As a still further optional modification according to other further embodiments of the present invention, the method may further comprise evaluating 33a how many events occur per location area and/or time, and commanding 33b one of adjustment of transmission power of a sender and adjustment of antenna tilt of a sender.

According to still further embodiments of the present invention, the reporting 31 may be performed by the report configuration controller 21 according to FIG. 2A. Optionally, the commanding reporting 32a may also be performed by the report configuration controller 21 according to FIG. 2A, while the determining 32b may be performed by the location determination processor 22 according to FIG. 2A. Further optionally, the evaluating 33a and the commanding adjustment 33b may be performed by the sender overlap evaluation processor 23.

Figure 3B:
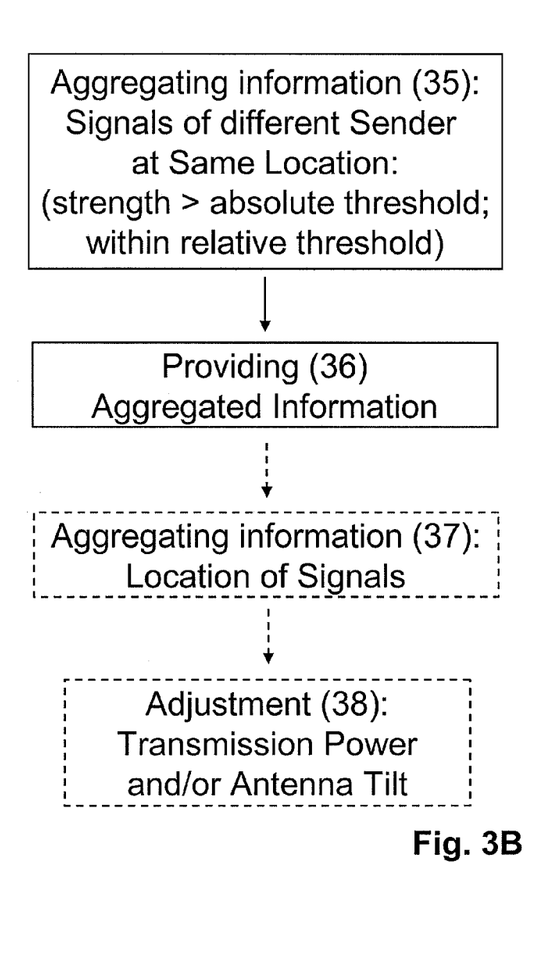
FIG. 3B shows another method according to certain embodiments of the present invention as well as a modification of this another method according to still other certain embodiments of the present invention.

FIG. 3B shows a principle flowchart of another method according to certain embodiments of the present invention. That is, as shown in FIG. 3B, the method comprises aggregating 35 information reflecting an event defined by receipt of a plurality of signals of different senders, wherein the signals are received at a same location, the signals are received with a strength above an absolute threshold, and a difference of the strengths is within a relative threshold; and providing 36 the aggregated information.

As optional modifications according to further embodiments of the present invention, in the method the aggregating information 35 may further include aggregating information 37 on the location of receipt of the signals.

As a still further optional modification according to other further embodiments of the present invention, the method may further comprise commanding one of adjustment 38 of sender transmission power and adjustment of sender antenna tilt.

According to still further embodiments of the present invention, the aggregating information 35 may be performed by the aggregator 26 according to FIG. 2B, and the providing aggregated information 36 may be performed by the aggregated information provider 27 according to FIG. 2B. Optionally, the aggregating information 37 may be also performed by the aggregator 26 according to FIG. 2B. Further optionally, the commanding adjustment 38 may be performed by the overlap adjustment processor 28 according to FIG. 2B.

Modifications of these embodiments as well as further independent embodiments will be described in further detail below.

According to certain embodiments of the present invention, a view on release 9 of the LTE standardization is taken, where the reduction of interference and reference signal pollution has been identified as a goal of the coverage and capacity optimization use case for SON.

According to certain embodiments of the present invention, a measurement-based procedure allows optimization of the cell overlap during operational phase of the network.

The procedure can involve one or more of the following. In a reporting configuration, a central SON entity which can be e.g. located in a DM or a NM in OAM configures the cell overlap reporting by specifying the values:

report configuration parameters: R, $N_{cells}$, $\Delta d$ and aggregation information A, where $N_{cells}$ designates the number of strongest cells of a particular neighbor measurement environment, R designates the maximum difference of signal strength between the $N_{cells}$ strongest cells of a particular neighbor measurement environment which is relevant for reporting, $\Delta d$ designates the minimum required radial distance between the measurement positions which is relevant for reporting, which can also be expressed in equivalent information, such as a minimum difference in the timing advance of the measurements, and A designates the aggregation information which indicates in which format a reporting is to be made and upon which condition.

This configuration of the reporting is signaled via management interfaces. According to certain embodiments of the present invention, the reporting is done by an eNB, i.e. the respective functions are implemented therein.

The timing advance addressed above is a signal sent by a base station such as eNB to a terminal such as a UE which the UE uses to advance its timings of transmissions to the base station so as to compensate for propagation delay.

Specifically, the timing advance value corresponds to the length of time a signal from the UE takes to reach the base station. That is, since the different UE are various distances away from the base station and radio waves travel at the finite speed of light, the precise time at which the UE is allowed to transmit a burst of traffic within must be adjusted accordingly. The timing advance is the variable controlling this adjustment.

A continually adjusted TA value avoids interference to and from other users, thereby minimizing data loss and maintaining call quality. Timing Advance is significant for privacy and communications security, as its combination with other variables can allow locating and tracking the UE.

The above described procedure according to certain embodiments of the present invention can further involve one or more of the following, according to further certain embodiments of the present invention.

Specifically, in case there is a conflict between the neighbor measurement configuration and the cell overlap reporting configuration of a UE, the eNB notifies the (e.g. central) SON entity about the currently possible maximum range $R_{max}$ (as a modification of R, i.e. a parameter not set by an entity requesting the reporting, but returned in response to receiving the reporting parameter R). Such a conflict may be the case if the cell overlap reporting range R, i.e. the parameter to be reported from an eNB to a (e.g. central) SON entity is larger than the configured neighbor measurement reporting range, i.e. a parameter to be reported from a UE to the eNB set in order to report the signal strength of neighboring base stations (i.e. other eNB) so as to allow considering a handover.

Further, according to the reporting configuration, after the aggregation condition is fulfilled, each eNB sends a cell overlap report containing information on the received neighbor cell measurements from UEs that contained a list of $N_{cells}$ cells being the $N_{cells}$ strongest cells within each report and all received with signal strength deviating not more then R dB from each other, and exceeding a minimum required distance measure $\Delta d$.

The aggregation condition is derived from the aggregation information. Possible options include, but are not limited to, e.g. periodic reporting of the raw information, reporting every event, reporting only after $N_{reports}$ measurements containing the same cell list are received, or if at least $N_{reports}$ measurements are received within a certain time T.

The cell overlap report can, for example, contain the list of cell IDs, information on the signal strength (either raw measurements or processed (filtered, averaged) according to the aggregation information A), and localization information, such as TA or GPS-information processed according to the aggregation information.

The central SON entity can derive from this information the cells involved in an excessive cell overlap area and estimate the location and extension of the area.

Based on this information, countermeasures can be taken.

EXAMPLES

In the following, implementation examples according to the above described embodiments or forming further certain embodiments of the present invention will be explained.

In an implementation example the aggregation information is set such that every event is reported immediately. This can minimize effort for storing and processing in the eNB.

A further implementation example is to set $N_{cells}=2$, i.e. the reporting is done based on cell-pairs.

Still further, if in an implementation example R=3 dB is set, this triggers a reporting as soon as the two best cells (if combined with the preceding example) are received with signal levels (for example the RSRP) not deviating more than 3 dB.

In a still further implementation example, the eNB forwards the UE measurement reports after removing any bias in the measurements, such as HO offset, HO hysteresis, etc. and adds localization information, for example the timing advance belonging to this measurement report.

Moreover, in another implementation example, a (e.g. central) SON entity can perform data analysis and derive improved parameters to reduce the cell overlap. The degree of cell overlap can be estimated based on the localization information (e.g. the radial distance difference) and the impact on the system performance based on the number of reports received per time.

Furthermore, the analysis can include joint processing of the measurements with offline planning data.

Possible implementation examples for the countermeasures include, but are not limited to, adaptation of transmit power and antenna tilt of cells.

Further implementation examples include variations of the above, for example that almost no aggregation and interpretation is done at the eNB and almost unfiltered UE measurements will be forwarded, or that the eNB already aggregates and condenses the information accordingly.

According to certain embodiments of the present invention, advantages are achieved that this reporting allows optimization of cell overlap areas based on measurements, i.e. it avoids inherent errors and uncertainties of offline planning-tool based approaches.

Further possible advantages include that the signaling according to certain embodiments of the present invention can be standardized on management interfaces (e.g. the Itf-N interface) and involve certain processing of measurements at the eNB such as aggregation and removing bias.

Implementations of certain embodiments of the present invention include equipment for domain manager, network manager and eNB.

As indicated above, it is considered that certain embodiments of the present invention can advantageously be applied to 3GPP based environments such as a LTE compliant SON entity or eNB product or equipment thereof.

Figure 4A:
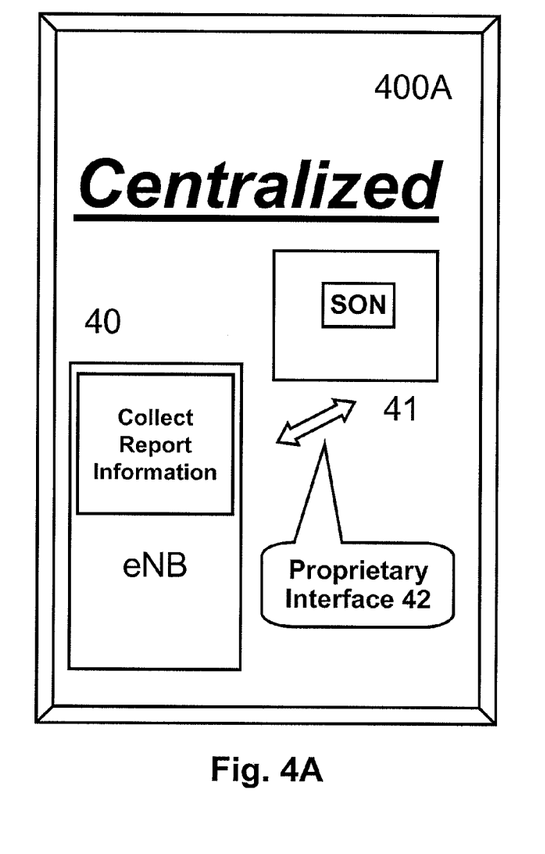
FIG. 4A illustrates an implementation example according to certain embodiments of the present invention.
Figure 4B:
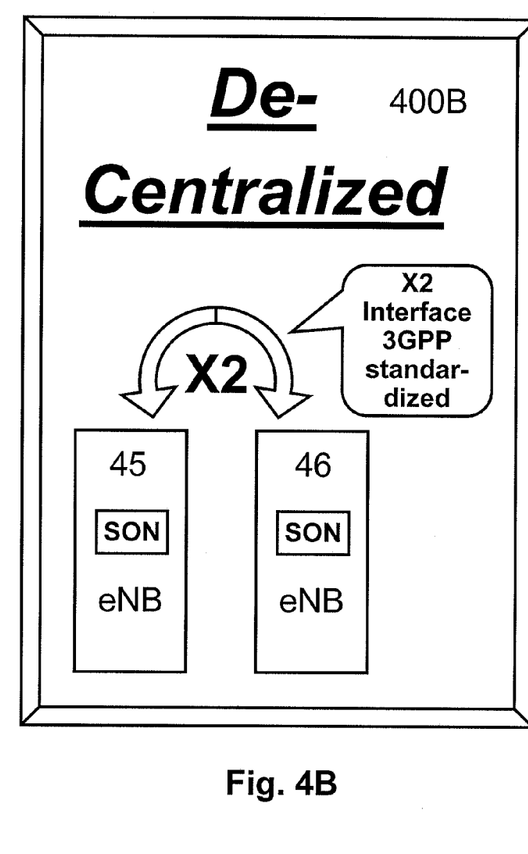
FIG. 4B illustrates another implementation example according to other certain embodiments of the present invention.

Though, it should be apparent that a SON entity and its equipment, respectively, can be provided centralized or de-centralized as depicted in FIGS. 4A and 4B.

Specifically, FIG. 4A shows a system 400A where the SON entity 41 is provided as a centralized element, i.e. separate from an eNB 40, which collects the report information. At present, connectivity and thus any reporting will have to be provided over a proprietary interface 42, but may involve any standardized present or future interface as well.

Moreover, as shown on FIG. 4B, in a system 400B the SON functionality is provided in a de-centralized manner, i.e. provided with two or more eNB 45, 46, which are connected with each other over X2 interface (as standardized according to 3GPP).

As described above, it is apparent that also in other communication networks implementation examples include centralized as well as de-centralized solutions.

According to the above description, it should thus be apparent that exemplary embodiments of the present invention provide, for example from the perspective of a network element such as a SON entity and an evolved Node B, respectively, or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of providing self optimization of cell overlap. Specifically, an apparatus comprises a report configuration controller configured to command reporting an event defined by receipt of a plurality of signals of different senders, wherein the signals are received at a same location, the signals are received with a strength above an absolute threshold, and a difference of the strengths is within a relative threshold. Another apparatus comprises an aggregator configured to aggregate information reflecting an event defined by receipt of a plurality of signals of different senders, wherein the signals are received at a same location, the signals are received with a strength above an absolute threshold, and a difference of the strengths is within a relative threshold; and an aggregated information provider configured to provide the aggregated information.

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus comprising one or more processors and one or more memories including computer program code, the one or more memories and the computer program code configured, with the one or more processors, to cause the apparatus to perform at least the following:
   command reporting an event defined by receipt of a plurality of respective signals each being associated with a corresponding sender of a plurality of different senders, wherein the plurality of respective signals are received at a same location, each of the respective signals are received with a corresponding strength above an absolute threshold, and the corresponding strength for each of the respective signals falls within a relative threshold; and
   adjust the relative threshold based on information on a handover reporting procedure involving a sender connectivity change based on a handover criterion reflecting a difference in signal strength received from a first sender of the plurality of different senders and a second sender of the plurality of different senders.

2. The apparatus according to claim 1, wherein the one or more memories and the computer program code are further configured, with the one or more processors, to cause the apparatus to command reporting information on the location of receipt of the signals; and
   determine a radial distance of receipt of a respective signal from a corresponding sender of the signal based on information on the location of receipt of the signal.

3. The apparatus according to claim 2, wherein the information on the location of receipt of a signal is one of information from a global positioning system and information on a signal propagation time from the location of receipt of the signal to the corresponding sender.

4. The apparatus according to claim 1, wherein the one or more memories and the computer program code are further configured, with the one or more processors, to cause the apparatus to command the reporting to take place when a condition selected from the following group is fulfilled: a time period has expired; there is a new event; among a plurality of events, a particular sender is concerned at a number of times above a sender number threshold; and a number of events per time period exceeds an event number threshold.

5. The apparatus according to claim 1, wherein the one or more memories and the computer program code are further configured, with the one or more processors, to cause the apparatus to command reporting an identity of each sender sending a signal involved in the event.

6. The apparatus according to claim 1, wherein the one or more memories and the computer program code are further configured, with the one or more processors, to cause the apparatus to evaluate how many events occur per location area and/or time, and to command one of adjustment of transmission power of a sender and adjustment of antenna tilt of a sender.

7. An apparatus comprising one or more processors and one or more memories including computer program code, the one or more memories and the computer program code configured, with the one or more processors, to cause the apparatus to perform at least the following:
   aggregate information reflecting an event defined by receipt of a plurality of respective signals each being associated with a corresponding sender of a plurality of different senders, wherein the plurality of respective signals are received at a same location, each of the respective signals are received with a corresponding strength above an absolute threshold, and a the corresponding strength for each of the respective signals falls within a relative threshold;
   provide the aggregated information;
   generate information on a handover reporting procedure involving a sender connectivity change based on a handover criterion reflecting a difference in signal strength received from a first sender of the plurality of different senders and a second sender of the plurality of different senders by comparing the relative threshold with the handover criterion; and
   provide the handover criterion as an excluded upper limit for the relative threshold.

8. The apparatus according to claim 7, wherein the one or more memories and the computer program code are further configured, with the one or more processors, to cause the apparatus to command reporting information on the location of receipt of the respective signals.

9. The apparatus according to claim 7, wherein the information on the location of receipt of a signal of the respective signals is one of information from a global positioning system and information on a signal propagation time from the location of receipt of the signal to the sender.

10. The apparatus according to claim 7, wherein the one or more memories and the computer program code are further configured, with the one or more processors, to cause the apparatus to provide the aggregated information when a condition selected from the following group is fulfilled: a time period has expired; there is a new event; among a plurality of events, a particular sender is concerned at a number of times above a sender number threshold; and a number of events per time period exceeds an event number threshold.

11. The apparatus according to claim 7, wherein the one or more memories and the computer program code are further configured, with the one or more processors, to cause the apparatus to provide an identity of each sender sending a signal involved in the event.

12. The apparatus according to claim 7, wherein the one or more memories and the computer program code are further configured, with the one or more processors, to cause the apparatus to command one of adjustment of sender transmission power and adjustment of sender antenna tilt.

13. An evolved Node B, comprising:
an apparatus according to claim 7.

14. A system comprising an apparatus according to claim 1, wherein the one or more memories and the computer program code are further configured, with the one or more processors, to cause the apparatus to aggregate information reflecting the event defined by receipt of the plurality of signals of different senders; and
wherein the system further comprises an aggregated information provider configured to provide the aggregated information.

15. A method, comprising:
commanding reporting an event defined by receipt of a plurality of respective signals each being associated with a corresponding sender of a plurality of different senders, wherein the plurality of respective signals are received at a same location, each of the respective signals are received with a corresponding strength above an absolute threshold, and the corresponding strength for each of the respective signals falls within a relative threshold; and
adjusting the relative threshold based on information on a handover reporting procedure involving a sender connectivity change based on a handover criterion reflecting a difference in signal strength received from a first sender of the plurality of different senders and a second sender of the plurality of different senders.

16. The method according to claim 15, wherein the commanding reporting further includes commanding reporting information on the location of receipt of the respective signals; and the method further comprising:
determining a radial distance of receipt of a signal of the respective signals from a corresponding sender of the signal based on information on the location of receipt of the signal.

17. The method according to claim 15, wherein the information on the location of receipt of a signal of the respective signals is one of information from a global positioning system and information on a signal propagation time from the location of receipt of the signal to the corresponding sender.

18. The method according to claim 15, wherein the commanding reporting further includes commanding that the reporting is to take place when a condition selected from the following group is fulfilled: a time period has expired; there is a new event; among a plurality of events, a particular sender is concerned at a number of times above a sender number threshold; and a number of events per time period exceeds an event number threshold.

19. The method according to claim 15, further comprising:
commanding reporting an identity of each sender sending a signal involved in the event.

20. The method according to claim 15, further comprising:
evaluating how many events occur per location area and/or time, and
commanding one of adjustment of transmission power of a sender and adjustment of antenna tilt of a sender.

21. A method, comprising:
aggregating information reflecting an event defined by receipt of a plurality of respective signals each being associated with a corresponding sender of a plurality of different senders, wherein the plurality of respective signals are received at a same location, each of the respective signals are received with a corresponding strength above an absolute threshold, and the corresponding strength for each of the respective signals falls within a relative threshold;
generating information on a handover reporting procedure involving a sender connectivity change based on a handover criterion reflecting a difference in signal strength received from a first sender of the plurality of different senders and a second sender of the plurality of different senders by comparing the relative threshold with the handover criterion;
providing the aggregated information; and
providing the handover criterion as an excluded upper limit for the relative threshold.

22. The method according to claim 21, wherein the aggregating information further includes aggregating information on the location of receipt of the respective signals.

23. The method according to claim 21, wherein the information on the location of receipt of a signal of the respective signals is one of information from a global positioning system and information on a signal propagation time from the location of receipt of the signal to the corresponding sender.

24. The method according to claim 21, wherein the providing further includes providing the aggregated information when a condition selected from the following group is fulfilled: a time period has expired; there is a new event; among a plurality of events, a particular sender is concerned at a number of times above a sender number threshold; and a number of events per time period exceeds an event number threshold.

25. The method according to claim 21, further comprising:
providing an identity of each sender sending a signal involved in the event.

26. The method according to claim 21, further comprising:
commanding one of adjustment of sender transmission power and adjustment of sender antenna tilt.

27. A computer program product comprising computer-executable components which perform, when the program is run on a computer:
commanding reporting an event defined by receipt of a plurality of respective signals each being associated with a corresponding sender of a plurality of different senders, wherein the plurality of respective signals are received at a same location, each of the respective signals are received with a corresponding strength above an absolute threshold, and the corresponding strength for each of the respective signals falls within a relative threshold; and
adjusting the relative threshold based on information on a handover reporting procedure involving a sender connectivity change based on a handover criterion reflecting a difference in signal strength received from a first sender of the plurality of different senders and a second sender of the plurality of different senders.

28. The computer program product according to claim 27, embodied as a computer-readable storage medium.

29. A computer program product comprising computer-executable components which perform, when the program is run on a computer:
- aggregating information reflecting an event defined by receipt of a plurality of respective signals each being associated with a corresponding sender of a plurality of different senders, wherein the plurality of respective signals are received at a same location, each of the respective signals are received with a corresponding strength above an absolute threshold, and the corresponding strength for each of the respective signals falls within a relative threshold;
- generating information on a handover reporting procedure involving a sender connectivity change based on a handover criterion reflecting a difference in signal strength received from a first sender of the plurality of different senders and a second sender of the plurality of different senders by being configured to compare the relative threshold with the handover criterion; and
- providing the handover criterion as an excluded upper limit for the relative threshold.

30. The computer program product according to claim 29, embodied as a computer-readable storage medium.

* * * * *